United States Patent
Burlik

(10) Patent No.: US 10,268,756 B2
(45) Date of Patent: Apr. 23, 2019

(54) METHOD AND APPARATUS FOR PROVIDING NATURAL LANGUAGE INPUT IN A CARTOGRAPHIC SYSTEM

(71) Applicant: HERE Global B.V., Veldhoven (NL)

(72) Inventor: Volodimir Burlik, Veldhoven (NL)

(73) Assignee: HERE Global B.V., Veldhoven (NL)

( * ) Notice: Subject to any disclaimer, the term of this patent is extended or adjusted under 35 U.S.C. 154(b) by 27 days.

(21) Appl. No.: 14/974,674

(22) Filed: Dec. 18, 2015

(65) Prior Publication Data
US 2017/0177710 A1    Jun. 22, 2017

(51) Int. Cl.
*G06F 17/27*    (2006.01)
*G06F 17/30*    (2006.01)
(Continued)

(52) U.S. Cl.
CPC ... *G06F 17/30684* (2013.01); *G01C 21/3608* (2013.01); *G01C 21/3667* (2013.01);
(Continued)

(58) Field of Classification Search
CPC .............. G06F 17/30684; G06F 17/28; G06F 17/30654; G06F 17/2229; G06F 17/3043;
(Continued)

(56) References Cited

U.S. PATENT DOCUMENTS 6,434,524 B1 * 8/2002 Weber ................ G06F 3/16
                                                  704/10
6,574,624 B1    6/2003 Johnson et al.
(Continued)

FOREIGN PATENT DOCUMENTS

WO    2006128123 A2    11/2006

OTHER PUBLICATIONS

Office Action for corresponding European Patent Application No. 16203028.2-1952, dated May 10, 2017, 11 pages.
(Continued)

*Primary Examiner* — Dalena Tran
(74) *Attorney, Agent, or Firm* — Ditthavong & Steiner, P.C.

(57) ABSTRACT

An approach is provided for classifying natural language input into plurality of query processing levels. The approach involves parsing at least one natural language input into one or more words, wherein the at least one natural language input represents at least one cartographic query. The approach also involves mapping the one or more words to at least one function of a cartography system. The approach further involves determining an availability of the at least one function, one or more parameters associated with the at least one function, or a combination thereof with respect to at least one component of the cartography system. The approach also involves classifying the at least one cartographic query into at least one of a plurality of query processing levels based, at least in part, on the availability. The approach further involves initiating an execution of the at least one function at the classified at least one query processing level, wherein the execution of the at least one function generates one or more results of the at least one cartographic query based, at least in part, on the one or more parameters. The approach also involves causing, at least in part, a presentation of the one or more results as cartographic information in a user interface of the cartography system.

20 Claims, 14 Drawing Sheets

(51) Int. Cl.
*G01C 21/36* (2006.01)
*G10L 15/30* (2013.01)

(52) U.S. Cl.
CPC .... *G06F 17/2705* (2013.01); *G06F 17/30401* (2013.01); *G06F 17/30716* (2013.01); *G10L 15/30* (2013.01)

(58) Field of Classification Search
CPC ......... G10L 15/22; G10L 15/26; G10L 15/18; G10L 15/30
USPC ..... 701/410; 707/708, 706, 771; 704/9, 275, 704/246, 257
See application file for complete search history.

(56) References Cited

U.S. PATENT DOCUMENTS

| | | | |
|---|---|---|---|
| 6,766,320 B1 | 7/2004 | Wang et al. | |
| 6,910,003 B1* | 6/2005 | Arnold | G06F 17/30616 704/1 |
| 7,239,960 B2* | 7/2007 | Yokota | G01C 21/3476 340/995.19 |
| 7,403,938 B2 | 7/2008 | Harrison et al. | |
| 7,937,402 B2 | 5/2011 | Feng et al. | |
| 8,140,335 B2 | 3/2012 | Kennewick et al. | |
| 8,467,959 B2* | 6/2013 | Nesbitt | G01C 21/00 340/988 |
| 8,745,065 B2 | 6/2014 | Wang | |
| 9,620,113 B2* | 4/2017 | Kennewick | G10L 15/22 |
| 2007/0124263 A1 | 5/2007 | Katariya et al. | |
| 2008/0010259 A1* | 1/2008 | Feng | G06F 17/3087 |

OTHER PUBLICATIONS

Office Action for corresponding European Patent Application No. 16 203 028.2-1222, dated Aug. 16, 2018, 7 pages.

* cited by examiner

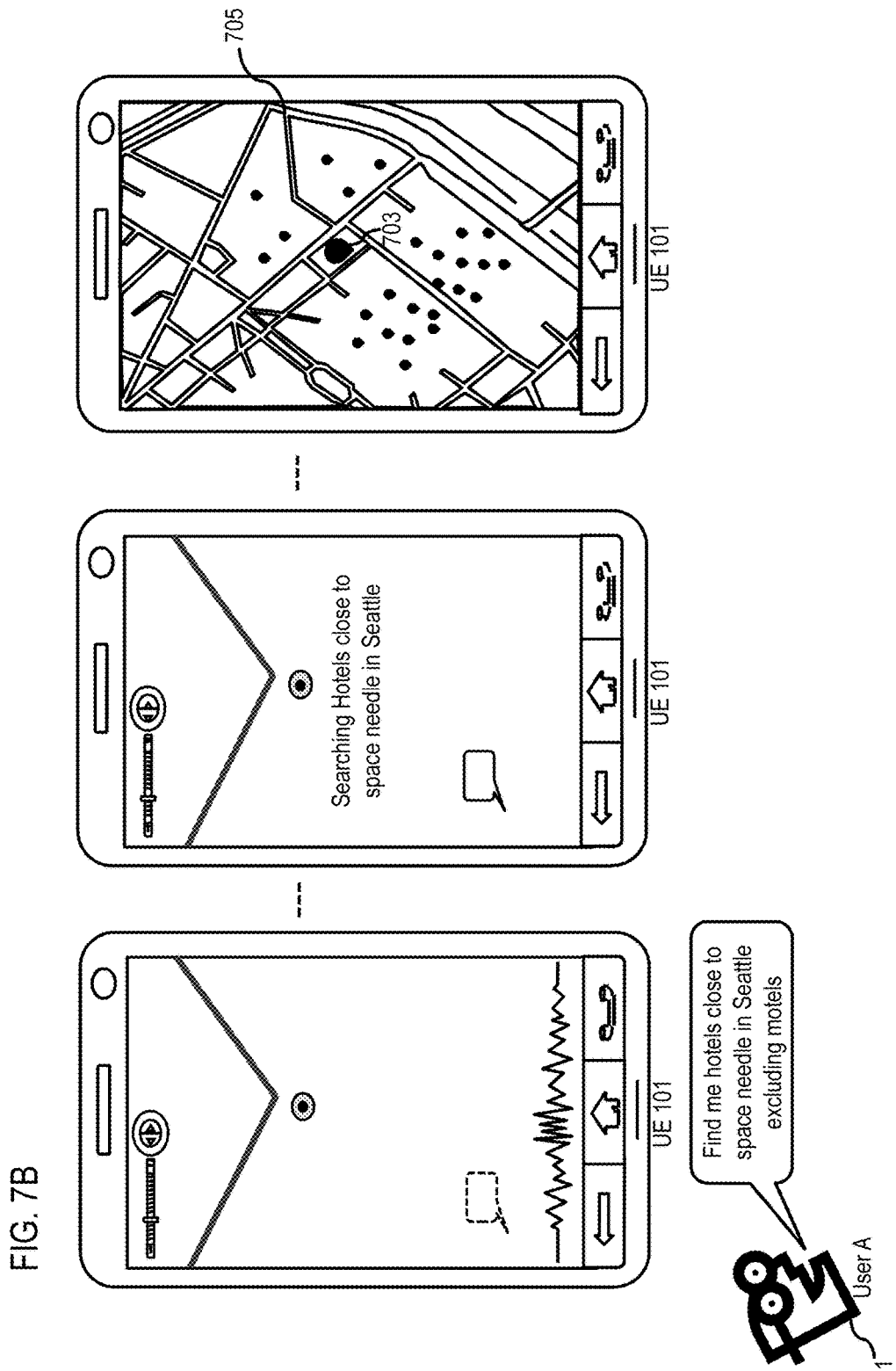

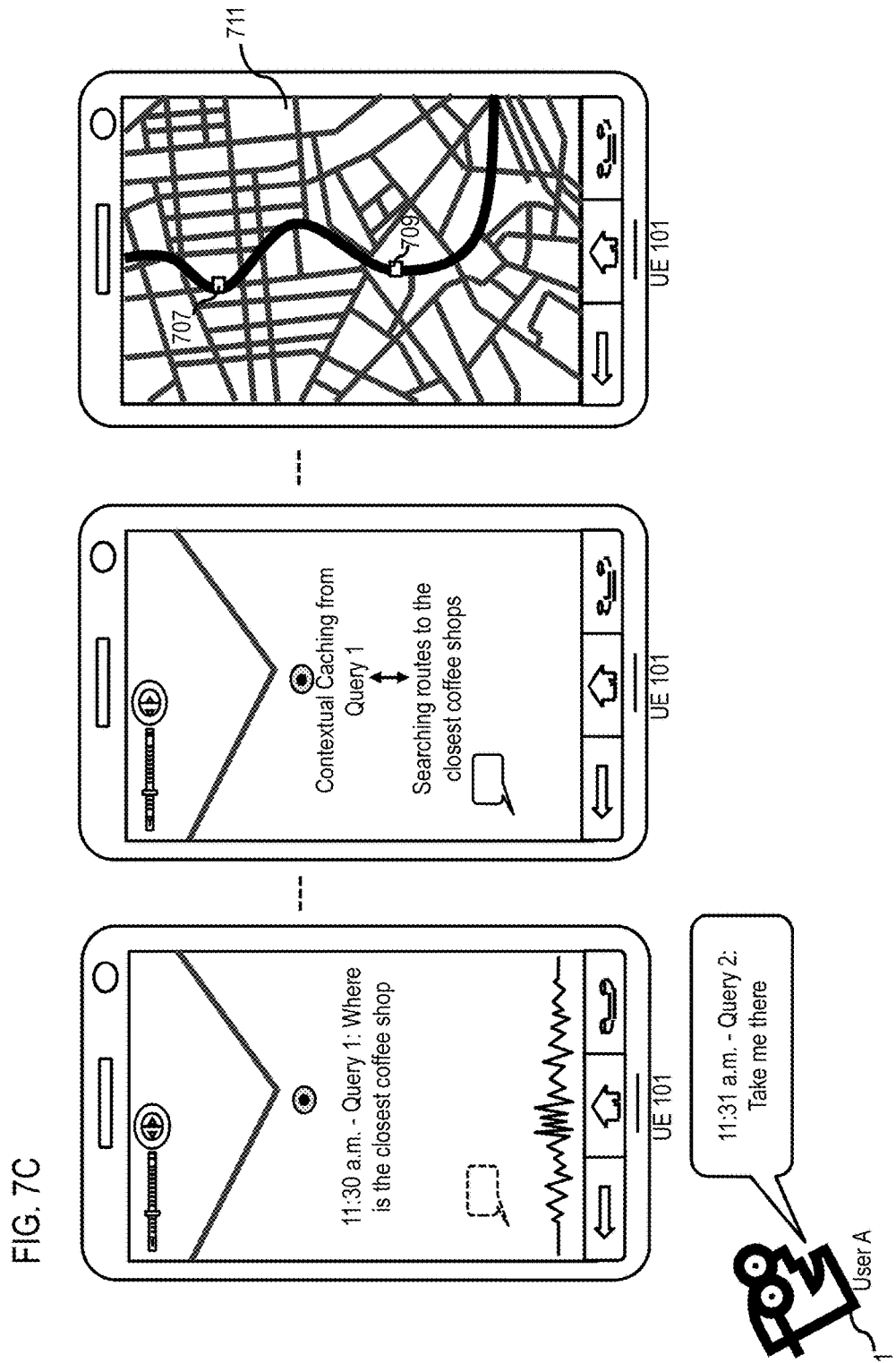

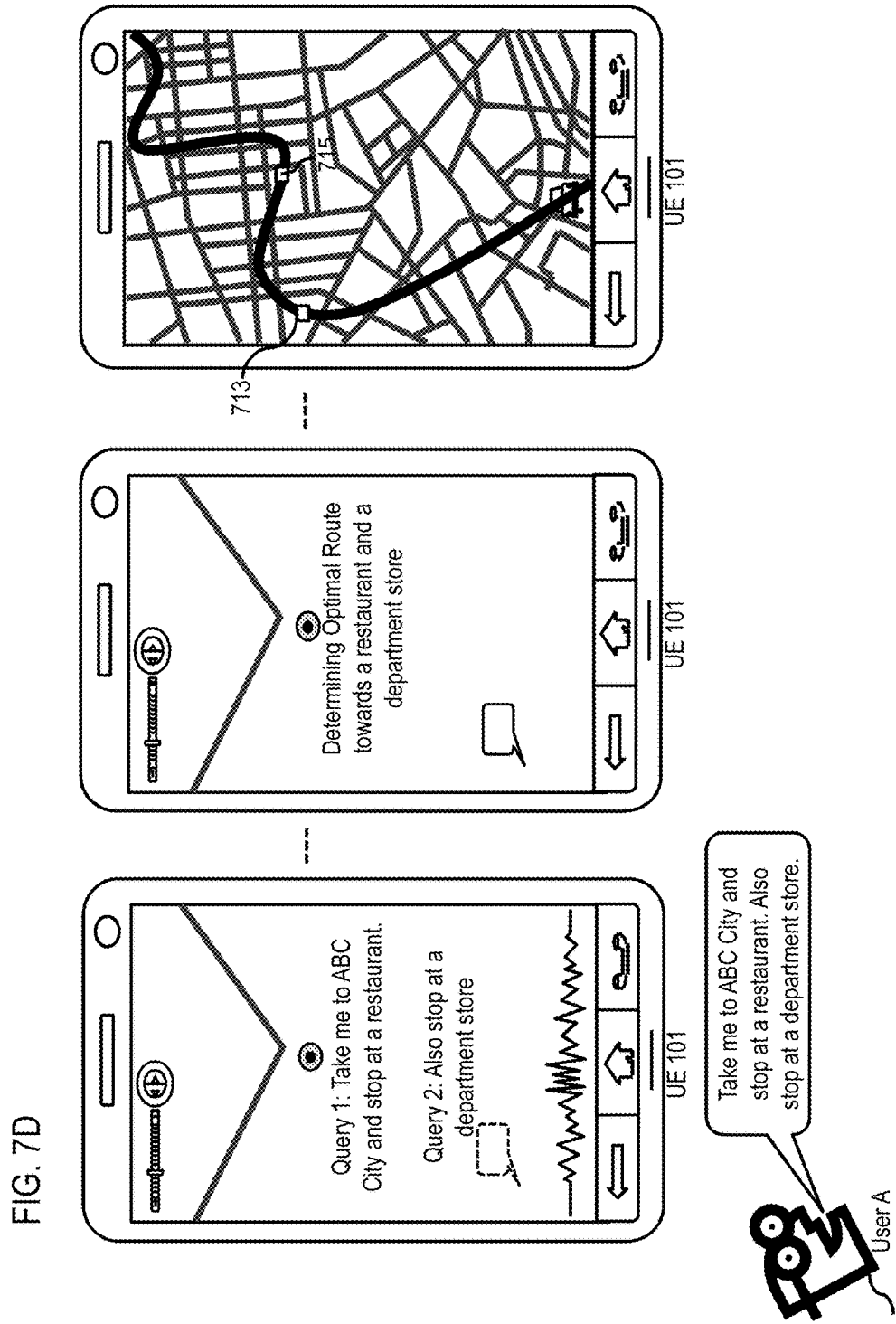

METHOD AND APPARATUS FOR PROVIDING NATURAL LANGUAGE INPUT IN A CARTOGRAPHIC SYSTEM

BACKGROUND

The interface between users and computerized system requires that the users adapt to the capabilities of the computerized system for it to understand input information and requests. With the passage of time, and emergence of the computerized system's ability to perform Natural Language Processing (NLP), the dynamics in interactions between users and technology has evolved and has become more sophisticated. However, the system is inefficient and error prone and works best if their domain of usage is limited to a specific category. Then again, limited domain may restrict interaction between the user and the system.

Some Example Embodiments

Therefore, there is a need for an approach for classifying natural language input into plurality of query processing levels.

According to one embodiment, a method comprises parsing at least one natural language input into one or more words, wherein the at least one natural language input represents at least one cartographic query. The method also comprises mapping the one or more words to at least one function of a cartography system. The method further comprises determining an availability of the at least one function, one or more parameters associated with the at least one function, or a combination thereof with respect to at least one component of the cartography system. The method also comprises classifying the at least one cartographic query into at least one of a plurality of query processing levels based, at least in part, on the availability. The method further comprises initiating an execution of the at least one function at the classified at least one query processing level, wherein the execution of the at least one function generates one or more results of the at least one cartographic query based, at least in part, on the one or more parameters. The method also comprises causing, at least in part, a presentation of the one or more results as cartographic information in a user interface of the cartography system.

According to another embodiment, an apparatus comprises at least one processor, and at least one memory including computer program code for one or more computer programs, the at least one memory and the computer program code configured to, with the at least one processor, cause, at least in part, the apparatus to parse at least one natural language input into one or more words, wherein the at least one natural language input represents at least one cartographic query. The apparatus is also caused to map the one or more words to at least one function of a cartography system. The apparatus is further caused to determine an availability of the at least one function, one or more parameters associated with the at least one function, or a combination thereof with respect to at least one component of the cartography system. The apparatus is also caused to classify the at least one cartographic query into at least one of a plurality of query processing levels based, at least in part, on the availability. The apparatus is further caused to initiate an execution of the at least one function at the classified at least one query processing level, wherein the execution of the at least one function generates one or more results of the at least one cartographic query based, at least in part, on the one or more parameters. The apparatus is also caused to cause, at least in part, a presentation of the one or more results as cartographic information in a user interface of the cartography system.

According to another embodiment, a computer-readable storage medium carries one or more sequences of one or more instructions which, when executed by one or more processors, cause, at least in part, an apparatus to parse at least one natural language input into one or more words, wherein the at least one natural language input represents at least one cartographic query. The apparatus is also caused to map the one or more words to at least one function of a cartography system. The apparatus is further caused to determine an availability of the at least one function, one or more parameters associated with the at least one function, or a combination thereof with respect to at least one component of the cartography system. The apparatus is also caused to classify the at least one cartographic query into at least one of a plurality of query processing levels based, at least in part, on the availability. The apparatus is further caused to initiate an execution of the at least one function at the classified at least one query processing level, wherein the execution of the at least one function generates one or more results of the at least one cartographic query based, at least in part, on the one or more parameters. The apparatus is also caused to cause, at least in part, a presentation of the one or more results as cartographic information in a user interface of the cartography system.

According to another embodiment, an apparatus comprises means for parsing at least one natural language input into one or more words, wherein the at least one natural language input represents at least one cartographic query. The apparatus also comprises means for mapping the one or more words to at least one function of a cartography system. The apparatus further comprises means for determining an availability of the at least one function, one or more parameters associated with the at least one function, or a combination thereof with respect to at least one component of the cartography system. The apparatus also comprises means for classifying the at least one cartographic query into at least one of a plurality of query processing levels based, at least in part, on the availability. The apparatus further comprises means for initiating an execution of the at least one function at the classified at least one query processing level, wherein the execution of the at least one function generates one or more results of the at least one cartographic query based, at least in part, on the one or more parameters. The apparatus also comprises means for causing, at least in part, a presentation of the one or more results as cartographic information in a user interface of the cartography system.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 7B is a user interface diagram for interpreting the recognized text string and deducing available functions required to serve the query expressed in the text string, according to one example embodiment;

FIG. 7C is a user interface diagram that represents contextual caching and transition between plurality of query processing levels, according to one example embodiment;

FIG. 7D is a user interface diagram wherein at least one optimal route is determined based, at least in part, on the natural language input, according to one example embodiment;

DESCRIPTION OF SOME EMBODIMENTS

Examples of a method, apparatus, and computer program for classifying natural language input into plurality of query processing levels are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1A:
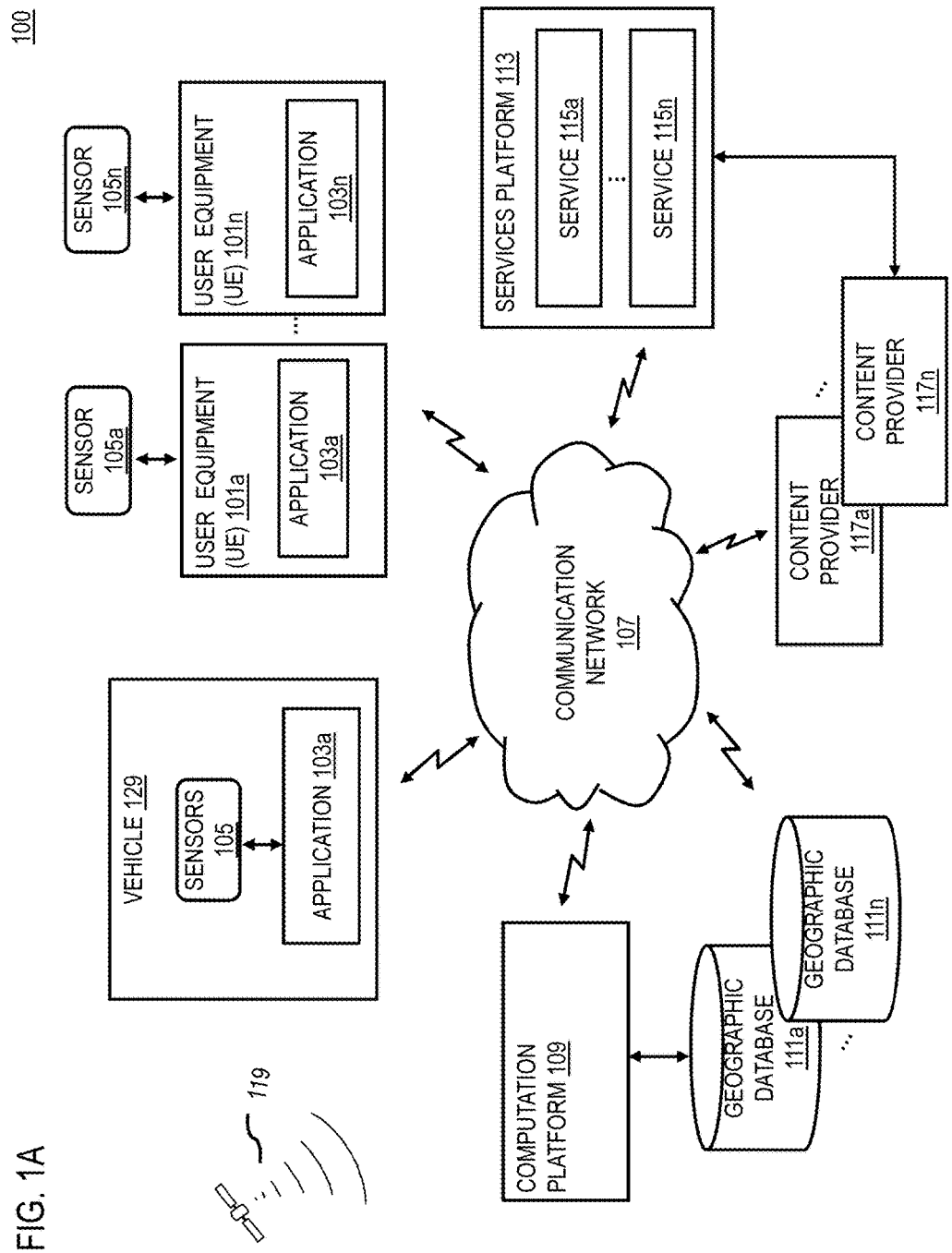
FIG. 1A is a diagram of a system capable of classifying natural language input into plurality of query processing levels, according to one example embodiment.

FIG. 1A is a diagram of a system capable of classifying natural language input into plurality of query processing levels, according to one embodiment. As discussed, users need to adapt to the capabilities of a computerized system for the computerized system to comprehend their requests. Introducing NLP to cartography applications has significantly simplified the interaction between users and their devices. Speech, as the easiest form of input, is interpreted as a query that a cartography application can handle. Though NLP services have alleviated these processes, users owning mobile devices and using cartography applications are not trained to impart specific and unequivocal instructions to their mobile devices. For example, user instructions can be a compound sentence or fuzzy or incomplete. Since the system is still error prone, their domain of usage may be limited to a certain category to make the processing more accurate. However, such reduced information set may limit the interaction between the users and their devices.

To address this problem, a system 100 of FIG. 1A introduces the capability to classify natural language input into plurality of query processing levels, according to one embodiment. The system 100 provides NLP service that allows the user to interact with the devices without having to limit the user's verbiage to a limited set of directions by processing the natural language input in different levels. Thereby enabling users to utilize everyday speech to communicate with their devices. The system 100 performs compound sentence analysis with respect to a query in various query processing levels to achieve efficient map search, high accuracy in map search results and fast delivery of map search results to a user.

In one scenario, a natural language input is a language used by a human user (as opposed to a computer language or other artificial language), including all of the idioms, assumptions and implications of an utterance. The computation platform 109 may process the natural language to determine the meaning of a natural language input such that the natural language input can be "understood" and/or acted on by the system. In one scenario, the system 100 may parse the sentence in one or more words to identify individual words in a natural language input. In another scenario, the system 100 may perform spell checking and/or grammar checking for the at least one natural language input to determine specific linguistic features.

Although various embodiments are described with respect to classifying natural language input into various processing levels, it is contemplated that the approach described herein may be applicable to any invention that can be modelled according the example processes described below and can benefit from classifying natural language input into various processing levels.

As shown in FIG. 1A, the system 100 comprises user equipment (UE) 101*a*-101*n* (collectively referred to as UE 101) that may include or be associated with applications 103*a*-103*n* (collectively referred to as applications 103) and sensors 105*a*-105*n* (collectively referred to as sensors 105). In one embodiment, the UE 101 has connectivity to a computation platform 109 via a communication network 107, e.g., a wireless communication network. In one embodiment, the computation platform 109 performs one or more functions associated with classifying natural language input into plurality of query processing levels.

As shown in FIG. 1A, the system 100 comprises of UE 101. In one embodiment, the UE 101 may include, but is not restricted to, any type of a mobile terminal, wireless terminal, fixed terminal, or portable terminal. Examples of the UE 101, may include, but are not restricted to, a mobile handset, a wireless communication device, a station, a unit, a device, a multimedia computer, a multimedia tablet, an Internet node, a communicator, a desktop computer, a laptop computer, a notebook computer, a netbook computer, a tablet computer, a Personal Communication System (PCS) device, a personal navigation device, a Personal Digital Assistant (PDA), a digital camera/camcorder, an infotainment system, a dashboard computer, a television device, or any combination thereof, including the accessories and peripherals of these devices, or any combination thereof. In one embodiment, the UE 101 may support any type of interface for supporting the presentment of one or more recommended routes towards at least one destination. In addition, the UE 101 may facilitate various input means for receiving and generating information, including, but not restricted to, a voice-based input mechanism, touch screen capability, a keyboard and keypad data entry, and the like. Any known and future implementations of the UE 101 may also be applicable. In one embodiment, the UE 101 may be included, embedded within, or communicatively connected to the one or more vehicles (e.g., vehicle 129). In one embodiment, the at least one or more vehicles 129 includes at least one autonomous vehicle, at least one highly-assisted driving vehicle, or a combination thereof.

The UE 101 may further include applications 103. Further, the applications 103 may include various applications such as, but not restricted to, location-based service application, navigation application, content provisioning application, camera/imaging application, speech recognition application, voice to text converter application, media player application, social networking application, calendar applications, multimedia application, and the like. In one embodiment, the applications 103 are installed within the UE 101. In one example embodiment, a voice-to-text converter application may convert or transcribe a natural language input to a text message. In another example embodiment, a location-based service application installed in the UE 101 enables the computation platform 109 to determine, for example, position, destination, heading, speed, context, identification, type, or any combination thereof, for at least one UE 101, such as vehicles.

The system 100 also includes one or more sensors 105, which can be implemented, embedded or connected to the UE 101 and/or vehicle 129. The sensors 105 may be any type of sensor. In certain embodiments, the sensors 105 may include, for example, but not restricted to, a global positioning sensor for gathering location data (e.g., Global Navigation Satellite System (GNSS) sensor), a network detection sensor for detecting wireless signals or receivers for different short-range communications (e.g., Bluetooth, Wi-Fi, Li-Fi, Near Field Communication (NFC) etc.), a camera/imaging sensor for gathering image data (e.g., the camera sensors may automatically capture traffic flow information and/or traffic light information), and the like. In one example embodiment, the UE 101 may include Global Positioning System (GPS) receivers to obtain geographic coordinates from satellites 119 for determining current location associated with the UE 101. Further, the location can be determined by an Assisted Global Positioning (A-GPS), Cell of Origin, a wireless signal triangulation system, or other location extrapolation technologies. In another example embodiment, the sensors 105 may provide in-vehicle navigation services, wherein one or more location based services may be provided to the at least one UE 101 associated with the at least one user of the vehicle and/or at least one other UE 101 associated with the at least one vehicle. In a further example embodiment, the one or more sensors 105 in the UE 101 or vehicle 129 enable determination, for example, position, destination, speed, type and identification, or any combination thereof, for the UE 101 or vehicle 129. In another embodiment, the sensors 105 may enable determination regarding the status situation in one or more road segments, such as, traffic or weather. In another embodiment, the sensors 105 may enable determination of context of the UE 101 or vehicle 129.

Further, various elements of the system 100 may communicate with each other through a communication network 107. The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular communication network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), vehicle controller area network (CAN bus), and the like, or any combination thereof.

In one embodiment, the computation platform 109 may be a platform with multiple interconnected components. The computation platform 109 may include one or more servers, intelligent networking devices, computing devices, components and corresponding software for classifying natural language input into plurality of query processing levels. In addition, it is noted that the computation platform 109 may be a separate entity of the system 100, a part of the one or more services 115a-115n (collectively referred to as services 115) of the services platform 113, or the UE 101.

In one embodiment, the computation platform 109 implements plurality of query processing levels for dealing with queries relating to maps and navigation. In one embodiment, the computation platform 109 may parse at least one natural language input into one or more words. Then, the computation platform 109 may map the one or more parsed words to at least one available function. Subsequently, the computation platform 109 may classify the one or more words into one of the plurality of query processing levels. In one example embodiment, the computation platform 109 may receive at least one natural language input (e.g., "where is the gas station?") from at least one user. Then, the computation platform 109 may parse the sentence into one or more words for mapping with the at least one available functions. The trigger word "where" is associated with the display function and the trigger word "gas station" is associated with the target object. Subsequently, the computation platform 109 may classify the trigger words into various query processing levels to get the results. In one scenario, a query processing level may include a local and reduced mapping of text strings, and may provide explicit instructions for a known query. In another scenario, a query processing level may include a formal search in an external database because the knowledge required to satisfy the query resides in a different database. In a further scenario, a query processing level may include determining at least one route between the device's current location and a second location based on contextual information and/or location information. Subsequently, the computation platform 109 causes a presentation of the result in a mapping user interface.

In one embodiment, the geographic database 111a-111n (collectively referred to as geographic database 111) may store one or more defined functions and/or one or more defined target objects. In one scenario, the one or more defined functions include records for natural language input created by collecting one or more input query sentences, extracting syntax from the one or more input query sentences, or a combination thereof. In another scenario, the one or more defined target objects includes an index that geographically correlates one or more target objects. In another embodiment, the geographic database 111 may store one or more previous input queries, result for the one or more previous input queries, or a combination thereof. In one example embodiment, the geographic database 111 may include a local database with a reduced mapping of text strings and defined functions for responding to the queries. The local database contains word-function mappings collected during a training phase. In a further embodiment, the geographic database 111 may store and manage data for one or more UE 101 and/or one or more vehicles pertaining to queries. The information may be any multiple types of information that can provide means for aiding in the content provisioning and sharing process. In one scenario, the geographic database 111 may include lexicons. In another scenario, the geographic database 111 can be updated by connecting to a backend service.

The services platform 113 may include any type of service. By way of example, the services platform 113 may include mapping services/application, navigation services/application, travel planning services/application, route calculation services/application, notification services/application, social networking services/application, content (e.g., audio, video, images, etc.) provisioning services/application, application services/application, storage services/application, contextual information determination services/application, location based services/application, information (e.g., weather, news, etc.) based services/application, etc. In one embodiment, the services platform 113 may interact with the UE 101, the computation platform 109 and the content provider 117 to supplement or aid in the processing of the content information. In one embodiment, the services platform 113 may be implemented or embedded in the computation platform 109 or in its functions.

By way of example, the services 115 may be an online service that reflects interests and/or activities of users. The services 115 allow users to share contact information, location information, activities information, contextual information, historical user information and interests within their individual networks, and provides for data portability. The services 115 may additionally assist in providing the computation platform 109 with information on travel plans of at least one user, activity information of at least one user, user profile information, and a variety of additional information.

The content providers 117a-117n (collectively referred to as content provider 117) may provide content to the UE 101, the vehicle 129, the computation platform 109, and the services 115 of the services platform 113. The content provided may be any type of content, such as, image content, textual content, audio content (e.g., audio notification), video content (e.g., visual notification), etc. In one embodiment, the content provider 117 may provide content that may supplement content of the applications 103, the sensors 105, or a combination thereof. In one embodiment, the content provider 117 may provide or supplement the mapping services/application, navigation services/application, travel planning services/application, route calculation services/application, notification services/application, social networking services/application, content (e.g., audio, video, images, etc.) provisioning services/application, application services/application, storage services/application, contextual information determination services/application, location based services/application, information (e.g., weather, news, etc.) based services/application, local map data, or any combination thereof. By way of example, the content provider 117 may provide content that may aid in determining at least one cartographic query. In one embodiment, the content provider 117 may also store content associated with the UE 101, the computation platform 109, and the services 115 of the services platform 113. In another embodiment, the content provider 117 may manage access to a central repository of data, and offer a consistent, standard interface to data, such as, a repository of cartographic queries. Any known or still developing methods, techniques or processes for assigning at least one location to at least one contact may be employed by the computation platform 109.

By way of example, the UE 101, the computation platform 109 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 1B:
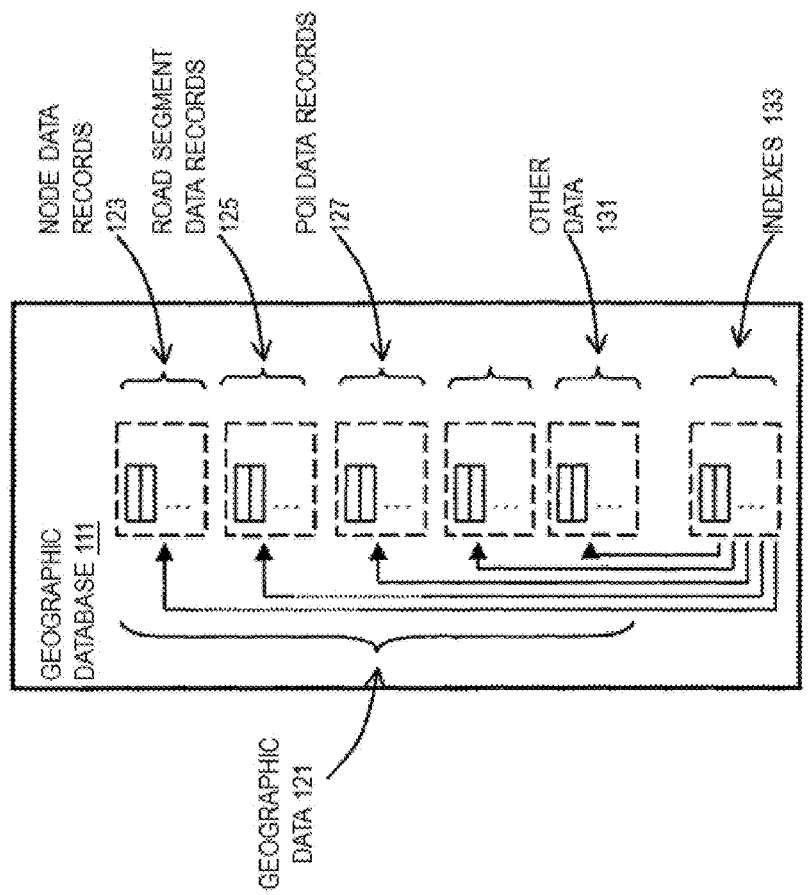
FIG. 1B is a diagram of the geographic database 111 of system 100, according to exemplary embodiments.

FIG. 1B is a diagram of the geographic database 111 of system 100, according to exemplary embodiments. In the exemplary embodiments, POIs and map generated POIs data can be stored, associated with, and/or linked to the geographic database 111 or data thereof. In one embodiment, the geographic or map database 111 includes geographic data 121 used for (or configured to be compiled to be used for) mapping and/or navigation-related services, such as for personalized route determination, according to exemplary embodiments. For example, the geographic database 111 includes node data records 123, road segment or link data records 125, POI data records 127, and other data records 131, for example. More, fewer or different data records can be provided. In one embodiment, the other data records 131 include cartographic ("carto") data records, routing data, traffic signal data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example.

In exemplary embodiments, the road segment data records 125 are links or segments representing roads, streets, parking areas, or paths, as can be used in the calculated route or recorded route information for determination of one or more personalized routes, according to exemplary embodiments. The node data records 123 are end points corresponding to the respective links or segments of the road segment data records 125. The road link data records 125 and the node data records 123 represent a road network, such as used by vehicles, cars, and/or other entities. Alternatively, the geographic database 111 can contain path segment and node data records or other data that represent pedestrian paths or areas in addition to or instead of the vehicle road record data, for example.

The road link and nodes can be associated with attributes, such as geographic coordinates, traffic lights, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, parking areas (attributes on which parking areas are critical) etc. The geographic database 111 can include data about the POIs and their respective locations in the POI data records 127. The geographic database 111 can also include data about places, such as cities, towns, or other communities, and other geographic features, such as bodies of water, mountain ranges, etc. Such place or feature data can be part of the POI data 127 or can be associated with POIs or POI data records 127 (such as a data point used for displaying or representing a position of a city). In addition, the geographic database 111 can include data from radio advertisements associated with the POI data records 127 and their respective locations in the radio generated POI records 129. By way of example, a street is determined from the user interaction with the UE 101 and the content information associated with the UE 101, according to the various embodiments described herein.

The geographic database 111 can be maintained by the content provider in association with the services platform 113 (e.g., a map developer). The map developer can collect geographic data to generate and enhance the geographic database 111. There can be different ways used by the map developer to collect data. These ways can include obtaining data from other sources, such as municipalities or respective geographic authorities (e.g., schedules for traffic light signals). In addition, the map developer can employ field personnel to travel by vehicle along roads throughout the geographic region to observe features and/or record information about them, for example. Also, remote sensing, such as aerial or satellite photography, can be used.

The geographic database 111 can be a master geographic database stored in a format that facilitates updating, maintenance, and development. For example, the master geographic database 111 or data in the master geographic database 111 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 111 can be a master geographic database, but in alternate embodiments, the geographic database 111 can represent a compiled navigation database that can be used in or with end user devices (e.g., UEs 101) to provided navigation-related functions. For example, the geographic database 111 can be used with the UE 101 to provide an end user with navigation features. In such a case, the geographic database 111 can be downloaded or stored on the UE 101, such as in the applications 103, or the UE 101 can access the geographic database 111 through a wireless or wired connection (such as via a server and/or the communication network 107), for example.

In one embodiment, the end user device or UE 101 can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device UE 101 can be a cellular telephone. An end user can use the device UE 101 for navigation functions, for example, map display for travelling in a route towards at least one destination.

Figure 2:
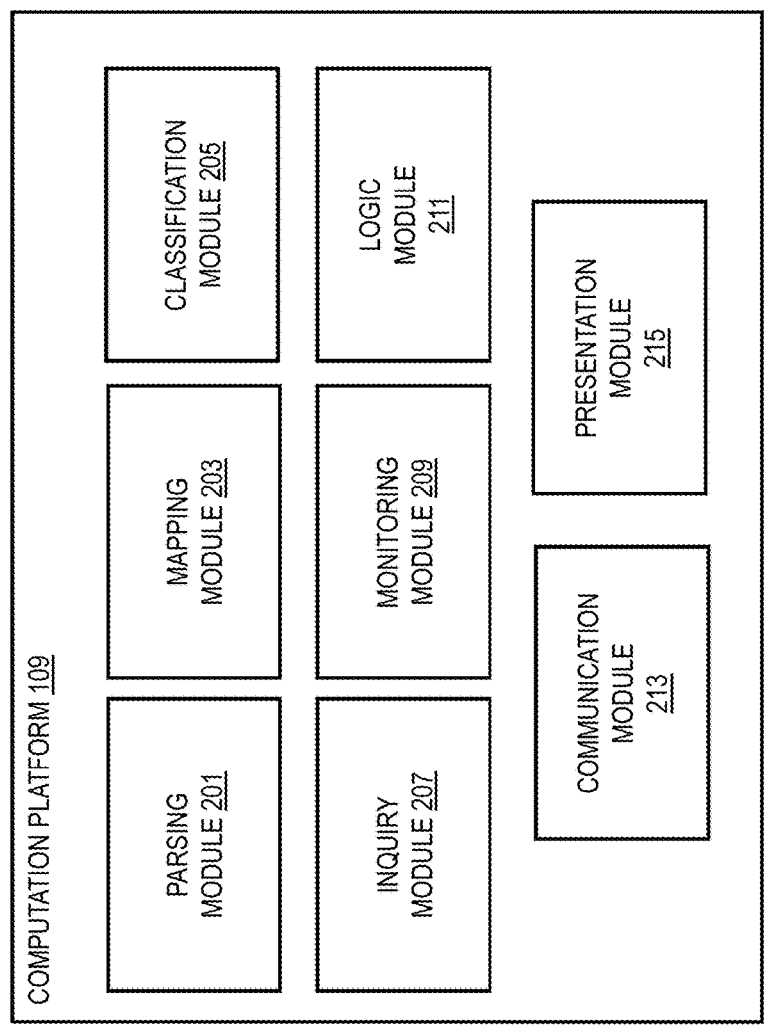
FIG. 2 is a diagram of the components of the computation platform 109, according to one example embodiment.

FIG. 2 is a diagram of the components of the computation platform 109, according to one example embodiment. By way of example, the computation platform 109 may include one or more components for classifying natural language input into plurality of query processing levels. In one embodiment, the computation platform 109 may include parsing modules 201, mapping module 203, classification modules 205, inquiry modules 207, monitoring module 209, logic modules 211, communication modules 213, and presentation modules 215. It is contemplated that the functions of these components may be combined in one or more components or performed by other components with similar functionalities.

In one embodiment, the parsing module 201 may parse at least one natural language input into one or more words. In one scenario, the parsing module 201 may extract syntactic and semantic information for the one or more words to determine complete phrases, partial phrases, or keywords. In another scenario, at least one natural language input includes at least one specialized natural language input, at least one formal search natural language input, at least one ambiguous natural language input, or a combination thereof.

In one embodiment, the mapping module 203 may map the one or more parsed words to at least one function from a set of functions in at least one query processing level. In one scenario, the mapping module 203 may cause a language mapping, a synonym mapping, a geospatial mapping, or a combination thereof for the at least one natural language input. In another scenario, a synonym mapping includes mapping synonymous words, abbreviated words, or a combination thereof. In a further scenario, the mapping module 203 may determine search parameters to limit the search in the at least one query processing level.

In one embodiment, the classification module 205 may categorize one or more topics of interest to one or more appropriate query processing level. In another embodiment, the classification module 205 may assist in routing the natural language input to one or more appropriate query processing level.

In one embodiment, the inquiry module 207 may determine a meaning for the at least one ambiguous natural language input by using input query history of the at least one user. In one scenario, the at least one ambiguous input query includes at least one incomplete input query. In another embodiment, the inquiry module 207 may determine one or more trigger words from the at least one natural language input, wherein the one or more trigger words causes a filtering of the at least one function. In a further embodiment, the inquiry module 207 may determine similarity among at least one input query, at least one previous input query, or a combination thereof. Then, the inquiry module 207 may cause, at least in part, a selection of the at least one previous input query based, at least in part, on the similarity, temporal information of the at least one previous input query, placement of the at least one previous input query, or a combination thereof.

In one embodiment, the monitoring module 209 may monitor at least one function, at least one target object, or a combination thereof in real-time. The monitoring module 209 may determine unavailability of the at least one function, at least one target object, or a combination thereof in the at least one query processing level, whereupon the monitoring module 209 may search for at least one function, at least one target object, or a combination thereof in other query processing levels. In one scenario, at least one target object includes an index that geographically correlates to at least one point of interest.

In one embodiment, the logic module 211 may manage tasks, including tasks performed by the other modules. For example, although the other modules may perform their actual tasks, the logic module 211 may determine when and how those tasks are performed or otherwise direct the other modules to perform the task.

The communication module 213 may be used for communication between various elements of the system 100 as well as between modules, elements, components, etc. of the computation platform 109. For example, the communication module 213 may be used to communicate commands, requests, etc., to/from the UE 101, computation platform 109, geographic database 111, the content provider 117, or the like.

In one embodiment, the presentation module 215 obtains a set of summary statistics and/or updates from the other modules. In one example embodiment, the presentation module 215 continues with generating an audio and/or video presentation of mapping and navigation information in a user interface of at least one device based, at least in part, on contextual information associated with at least one device associated with the at least one user, location information associated with the one or more target objects, or a combination thereof.

The above presented modules and components of the computation platform 109 can be implemented in hardware, firmware, software, or a combination thereof. Though depicted as a separate entity in FIG. 1A, it is contemplated that the computation platform 109 may be implemented for direct operation by respective UE 101. As such, the computation platform 109 may generate direct signal inputs by way of the operating system of the UE 101 for interacting with the applications 103. In another embodiment, one or more of the modules 201-215 may be implemented for operation by respective UEs, as the computation platform 109, or combination thereof. Still further, the computation platform 109 may be integrated for direct operation with the services 115, such as in the form of a widget or applet, in accordance with an information and/or subscriber sharing arrangement. The various executions presented herein contemplate any and all arrangements and models.

Figure 3:
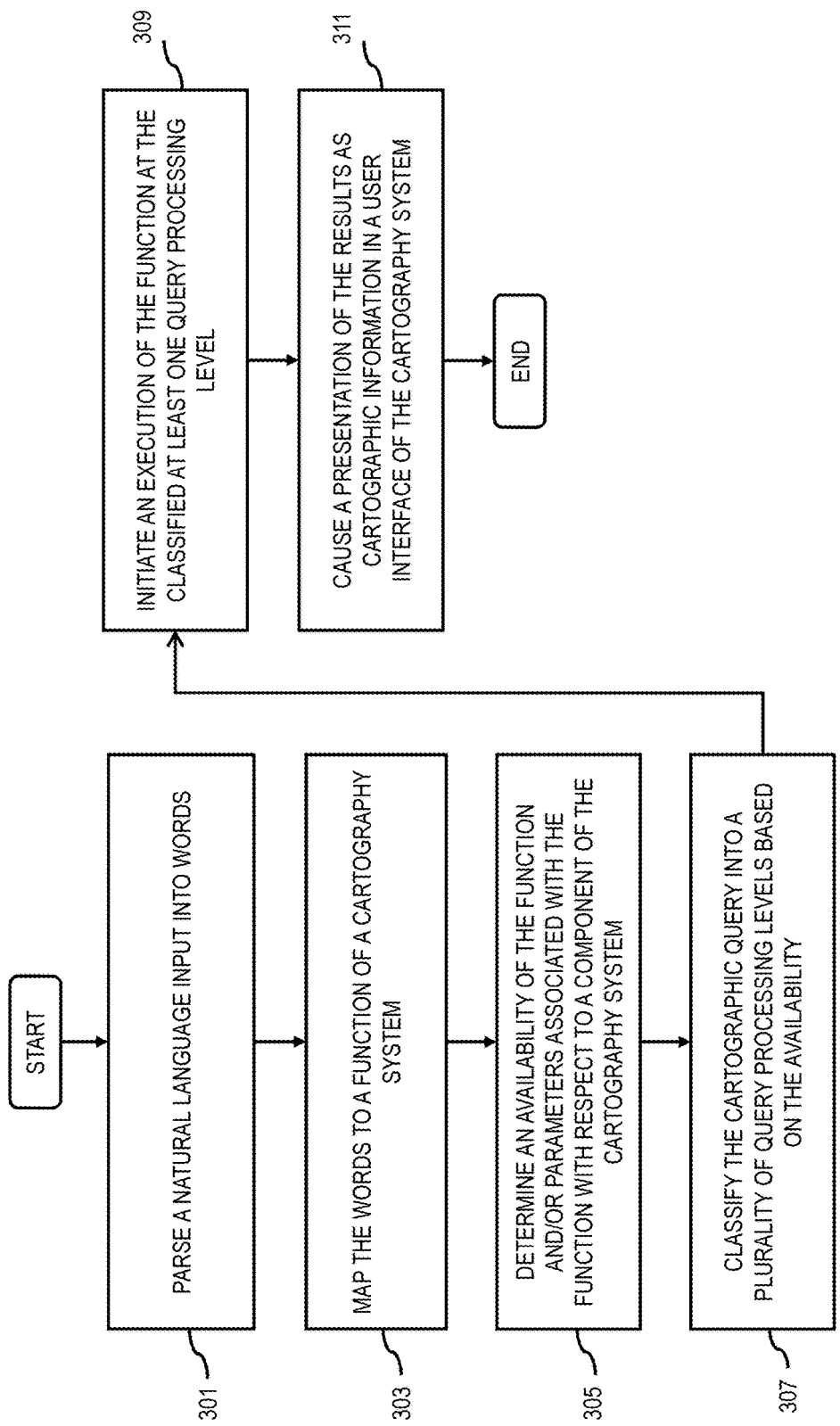
FIG. 3 is a flowchart of a process for classifying natural language input into plurality of query processing levels, according to one example embodiment.
Figure 9:
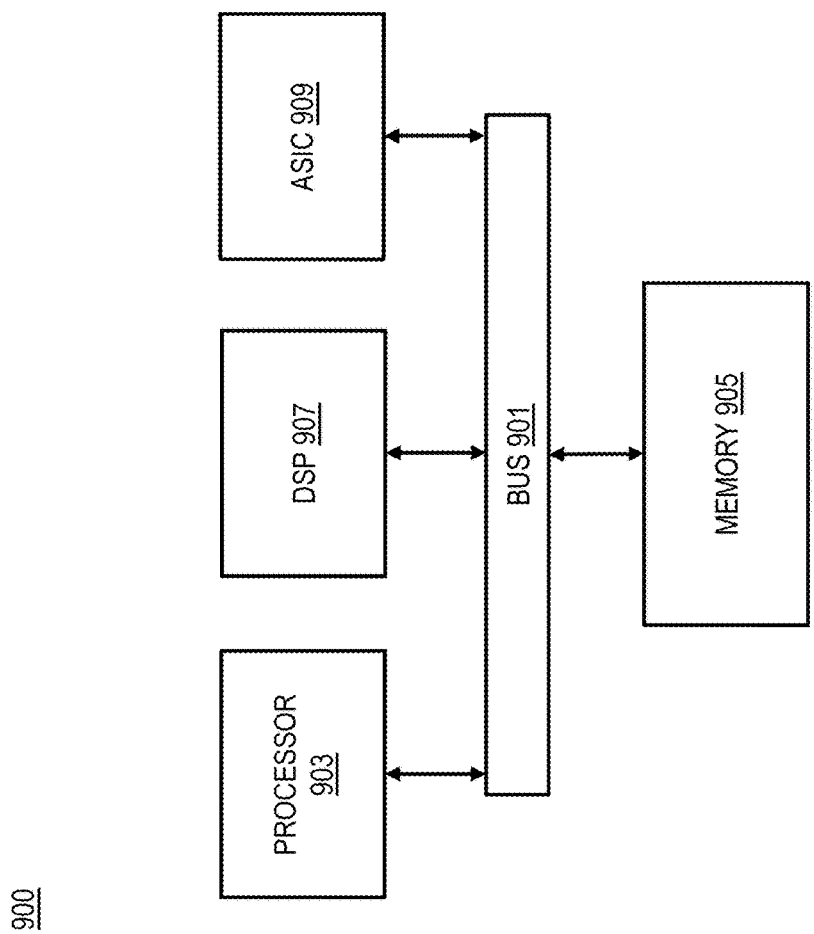
FIG. 9 is a diagram of a chip set that can be used to implement an embodiment of the invention.

FIG. 3 is a flowchart of a process for classifying natural language input into plurality of query processing levels, according to one example embodiment. In one embodiment, the computation platform 109 performs the process 300 and is implemented in, for instance, a chip set including a processor and a memory as shown in FIG. 9.

In step 301, the computation platform 109 may parse at least one natural language input into one or more words. In one embodiment, the at least one natural input represents at least one cartographic query. In one example embodiment, the computation platform 109 may recognize a sequence of characters, letters, words or phrases representing address related information from a natural language input during parsing. This recognition of address related information can be achieved by, for example, searching in one or more database of the geographic databases 111.

In step 303, the computation platform 109 may map the one or more words to at least one function of a cartography system. In one scenario, the computation platform 109 may access geographic database 111 to cause a mapping of the one or more words to at least one defined function, at least one defined target object, or a combination thereof.

In step 305, the computation platform 109 may determine an availability of the at least one function, one or more parameters associated with the at least one function, or a combination thereof with respect to at least one component of the cartography system. In one embodiment, the computation platform 109 may determine the availability of at least one function on receiving the at least one natural language input by the at least one component of the cartography system.

In step 307, the computation platform 109 may classify the at least one cartographic query into at least one of a plurality of query processing levels based, at least in part, on the availability. In one embodiment, the computation platform 109 may classify the at least one cartographic query on receiving the at least one natural language input by the at least one component of the cartography system. In one embodiment, the plurality of the query processing levels include, at least in part, a first processing level at which the at least one function, the one or more parameters, or a combination thereof are executed in whole locally at the at least one component of the cartography system. In another embodiment, the plurality of the query processing levels include, at least in part, a second processing level at which the at least one function, the one or more parameters, or a combination thereof are executed, at least in part, by conducting at least one search external to the at least component of the cartography system. In a further embodiment, the plurality of the query processing levels include, at least in part, a third processing level at which the at least one function, the one or more parameters, or a combination thereof are executed, at least in part, by routing between at least two locations.

In step 309, the computation platform 109 may initiate an execution of the at least one function at the classified at least one query processing level. The execution of the at least one function generates one or more results of the at least one cartographic query based, at least in part, on the one or more parameters. In one embodiment, the computation platform 109 may execute at least one function upon receiving the at least one natural language input by the at least one component of the cartography system. In one scenario, the computation platform 109 may deduce the function and the arguments from the natural language input. Then, the computation platform 109 may check for the presence of the arguments at the moment of the request in first processing level. If any of the arguments are not present, the search or routing is initiated in the second processing level or third processing level, depending on the intended function. In one example embodiment, the computation platform 109 may determine that first processing level does not have the list of target objects based on specified criteria (e.g., proximity information, location information, etc.). Then, the computation platform 109 may initiate a new search in a different processing level.

In step 311, the computation platform 109 may cause, at least in part, a presentation of the one or more results as cartographic information in a user interface of the cartography system. In one example embodiment, the computation platform 109 may present a map with determined routes highlighted therein towards one or more POIs.

Figure 4:
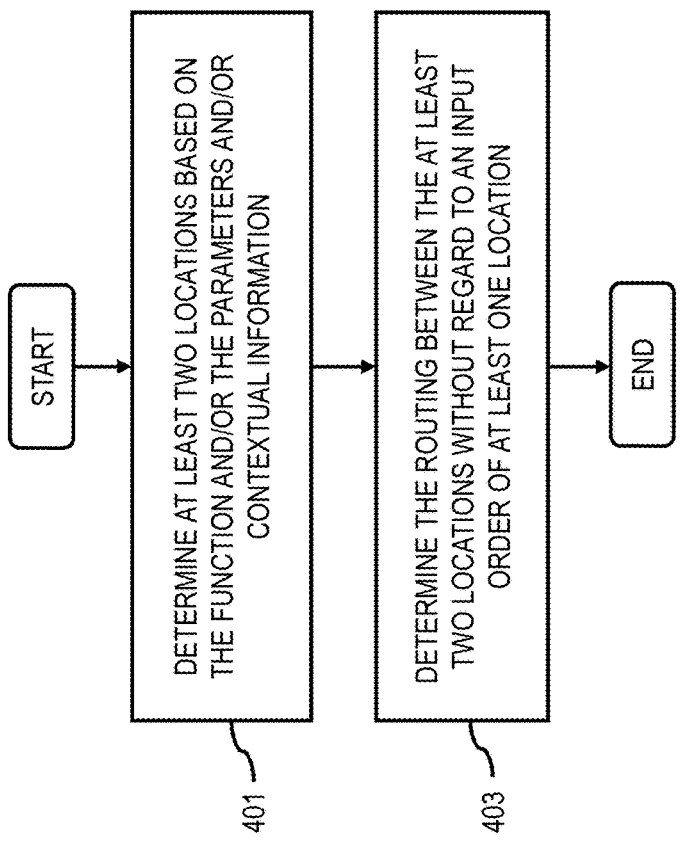
FIG. 4 is a flowchart of a process for routing between at least two determined locations, according to one example embodiment.

FIG. 4 is a flowchart of a process for routing between at least two determined locations, according to one example embodiment. In one embodiment, the computation platform 109 performs the process 400 and is implemented in, for instance, a chip set including a processor and a memory as shown in FIG. 9.

In step 401, the computation platform 109 may determine the at least two locations based, at least in part, on the at least one function, the one or more parameters, contextual information, or a combination thereof. In one scenario, two or more objects on a map may have different locations. The computation platform 109 may receive contextual information for at least one UE 101 associated with at least one user and the location information (or contextual information) for one or more POIs. Then, the computation platform 109 may determine at least one route between the current location of at least one UE 101 and a second location.

In step 403, the computation platform 109 may determine the routing between the at least two locations without regard to an input order of at least one location. In one example embodiment, several target objects with different location and/or contexts may be present in a single instructions (or series of instructions). The computation platform 109 may classify such instructions to third processing level to determine an optimal way of planning at least one route irrespective of the explicit order expressed in the instructions. In one scenario, the third processing level may determine whether a route optimization can take place and automatically request it from the routing API when submitting a request. In one example embodiment, an optimal method of planning at least one route may include integration of calendar information of at least one user (e.g., meetings/appointments in a user's calendar). In one scenario, the calendar information may comprise of location information for the scheduled meeting, date information for the scheduled meeting, time information for the scheduled meeting, purpose of the scheduled meeting etc. In one embodiment, the computation platform 109 may query at least one database associated with the at least one user to determine at least one calendar event. The calendar event may be shared by the computation platform 109 with at least one navigation system. Then, the routing algorithm may take the input from the NLP processing, and check for locations and timings of the calendar event(s). Subsequently, the routing algorithm determines a more efficient route that is compatible with the NLP input. In one embodiment, the one or more routes may indicate, at least in part, a direction, a pace, or a combination thereof based, at least in part, on the calendar information.

Figure 5:
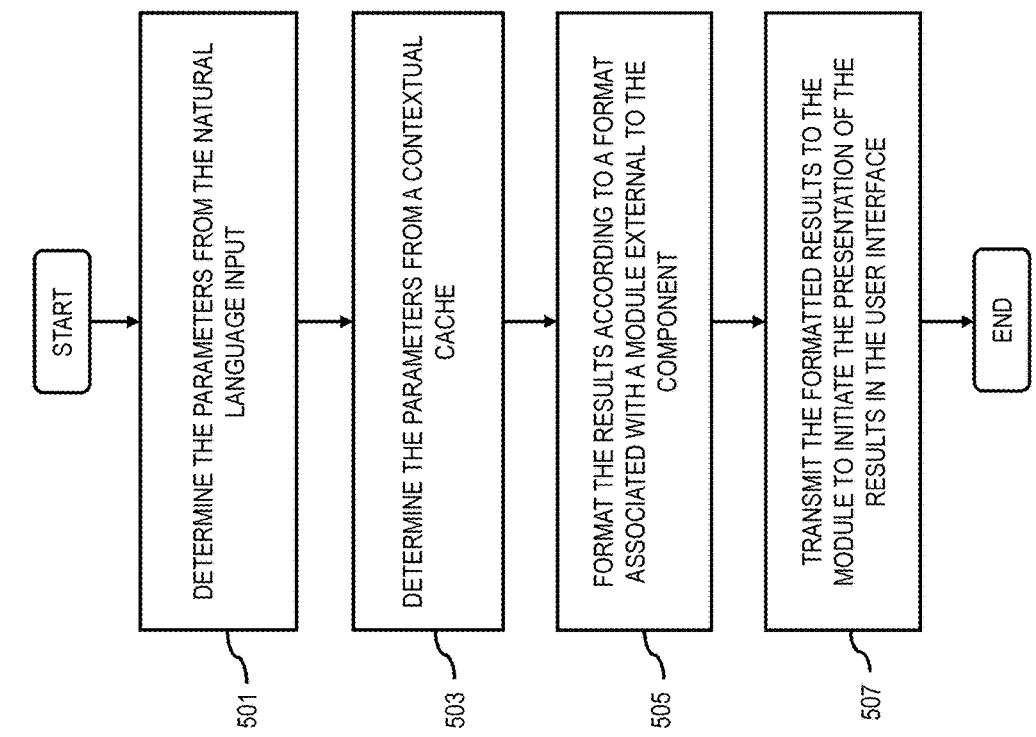
FIG. 5 is a flowchart of a process for determining one or more parameters and formatting one or more results, according to one example embodiment.

FIG. 5 is a flowchart of a process for determining one or more parameters and formatting one or more results, according to one example embodiment. In one embodiment, the computation platform 109 performs the process 500 and is implemented in, for instance, a chip set including a processor and a memory as shown in FIG. 9.

In step 501, the computation platform 109 may determine one or more parameters from a natural language input. In one example embodiment, a user may provide an input query (e.g., "Where can I find banks, excluding ABC banks?"). Then, the computation platform 109 may use the trigger word "where" as a search parameter to find a target (i.e., banks). In one scenario, trigger word "where" reduces the search area as compared to "close to" and/or "in". In addition, trigger word "excluding" is used as a parameter to filter POIs that are of no interest to the user (e.g., ABC banks). Subsequently, the computation platform 109 may display nearby banks apart from ABC banks in a user interface of a cartography application.

In step 503, the computation platform 109 may determine the one or more parameters from at least one contextual cache. In one embodiment, the at least one contextual cache stores one or more previous results, one or more previous functions, one or more previous parameters, or a combination thereof associated with at least one previous cartographic query. In one scenario, a command issued in a natural language may often be contextual. The computation platform 109 may retain previously received statements (e.g., queries or instructions) and the answers to the statements. In one example embodiment, a user may want to refine a previously issued search, or request for navigation alternatives, or request additional information about a POI, and so on. In doing so, the previously received statements and previously provided results are used to fill in the unknown arguments in the search. For example, if an initial query is "where is the next coffee shop" and the next instruction is "take me there", the level 1 (L1) processing needs to be able to retrieve the result of the preceding query to issue the instruction "FIND_ROUTE to <coffee shop location>." In one scenario, in natural language, the immediately previous query/reply will be the most relevant for filling out the unknown arguments. The relevance of previous queries/replies for ambiguous arguments decreases as the previous queries become older in time or as they move down in their order. In one example embodiment, the last result might not be as relevant for finding a route if the search location was performed hours ago (rather than within 5 minutes) or if there was another query issued in between. The following are examples of how caching enables computation platform 109 to understand conversation context:
1. "Show me closest the Starbucks?"
2. "Take me there" or "Drive me there" or "Walk me there"
3. "How far is it?" or "What is the address?"

Asking for address or other POI info depends on the previously mentioned contextual information.

In step 505, the computation platform 109 may format the one or more results according to at least one format associated with at least one module external to the at least one component. In one example embodiment, information stored in one or more databases are in an easily accessible JSON based format, although other formats may also be suitable. In one scenario, the three query processing levels may result in providing a specific formatted output that can be utilized by an external module, be it a Text-to-speech (TTS) module for responding, a search API, routing API, etc.

In step 507, the computation platform 109 may transmit the formatted one or more results to the at least one module to initiate the presentation of the one or more results in the user interface. In one scenario, the computation platform 109 may forward the formatted result to a different receiving API based, at least in part, on the query processing level that is processing the incoming string.

Figure 6:
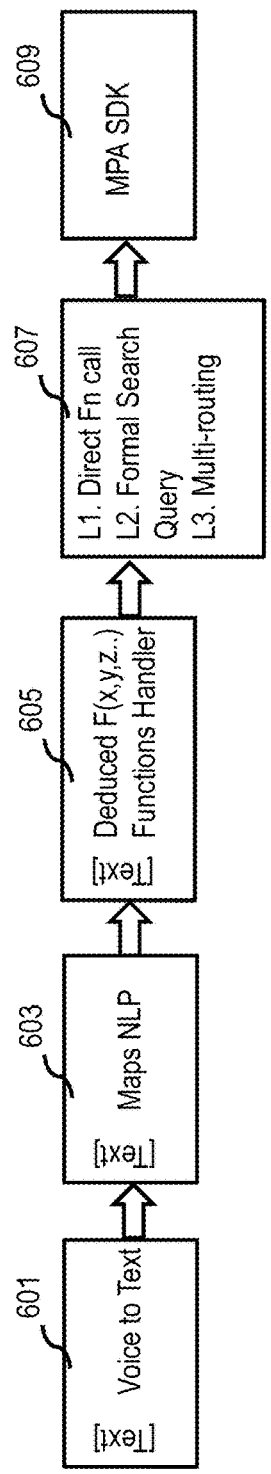
FIG. 6 is a flow diagram that represents the various query processing levels for at least one natural language input, according to one example embodiment.

FIG. 6 is a flow diagram that represents the various query processing levels for at least one natural language input, according to one example embodiment. In one example embodiment, one or more users may avoid using the screen of the phone to find at least one location by using his/her voice. In step 601, the voice is captured by the voice recognition services in at least one UE 101, and transformed into texts. In step 603, the resulting texts can be fed into a natural language processing (NLP) module as a text string. The NLP module formalizes the request and deduces the semantics of the sentences. The NLP module is tasked with interpreting the recognized text string and deducing which of the available functions may be required to serve the query expressed in the string. In order to correctly handle the many possible queries, the text processing needs to be handled on three different levels, which are tuned for the specific requirements of a cartography application. In step 605, the function handler module may classify the different words in the received string. In natural language, words can indicate different functions, relationships, objects, etc. For example, a user may state "show me hotels," the function is to display something and the parameter is the target object (i.e., hotels). In step 607, based on the available functions (e.g., F (x,y,z) parameters) command execution may happen on level 1 (L1), level 2 (L2) or level 3 (L3). In one scenario, processing level at L1 relates to explicit instructions, which are well known by the NLP module. L1 represents a level of 'a priori' knowledge, a local and reduced mapping of text strings and defined functions for responding. These can be thought of as direct function calls. A local database of NLP Knowledge may contain all of these word-function mappings that have been collected during a training phase. These are stored in an easily accessible JSON based format, although other formats may also be suitable. In L1 the system provides an immediate reaction when queried information is available. In another scenario, L2 refers to a level of processing where the knowledge required to satisfy the query resides outside of the NLP module. As such, L2 processing builds a formal search query that can be submitted to a database external to the NLP module, be it a local database (e.g. POI repository) or an online search engine. This level of processing serves for determining the location of different POIs. In a further scenario, the L3 refers to a level of processing in which queries/instructions may be more complex, involving several physical objects. As two or more objects on a map tend to have different locations, routes can be determined between the device's current location and a second location. This level of processing involves submitting information about the user's context and the POIs location (or even context). In addition, when several target objects with different location/contexts are present in a single command (or series of commands), L3 may identify that the situation may involve an optimal way of planning the route, other than the explicit order expressed in the command. In other words, L3 may determine whether a route optimization can take place and automatically request it from the routing API when submitting a request. Subsequently, the result may be presented as cartographic information in a user interface of the cartography system [609]. In one embodiment, all three levels result in providing a specific formatted output that can be utilized by an external module, be it a Text-to-speech (TTS) module for responding, a search API, routing API, etc. Depending on which level processes the incoming string, a response may be forwarded to a different receiving API.

Figure 7A:
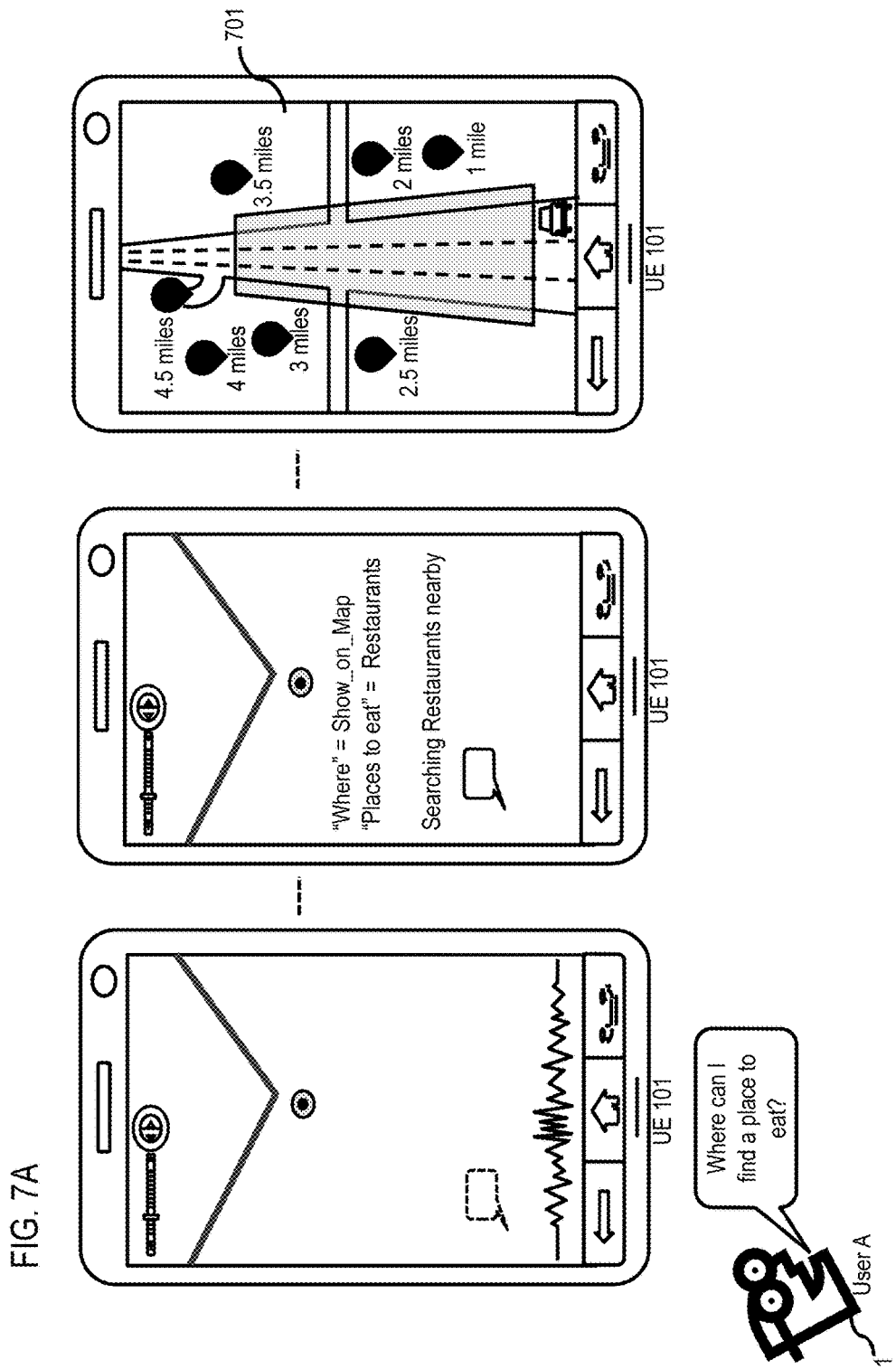
FIG. 7A is a user interface diagram that represents a scenario wherein a natural language input is interpreted to provide cartographic information in at least one user interface of a cartography system, according to one example embodiment.

FIG. 7A is a user interface diagram that represents a scenario wherein a natural language input is interpreted to provide cartographic information in at least one user interface of a cartography system, according to one example embodiment. In one scenario, user A may state "Where can I find a place to eat?" to his/her UE 101. Then, the computation platform 109 may parse the natural language input, and may associate the trigger word "where" with the function "SHOW_ON_MAP". Further, the computation platform 109 may consider the set of words "places to eat" as a synonym for restaurants, which leads to the query target object "restaurants". In one example embodiment, the computation platform 109 may parse and map user A's statement "Where can I find a place to eat?" as follows:

"Where" Function=SHOW_ON_MAP
"Places to eat" Target=restaurants.
That deduced function is 'search' with the argument=restaurants.

Then, the cartography application in at least one UE 101 may reply to a search function by displaying a list of restaurant with location information in the at least one mapping interface UE 101 [701].

FIG. 7B is a user interface diagram for interpreting the recognized text string and deducing available functions required to serve the query expressed in the text string, according to one example embodiment. In one scenario, user A may state "Find me hotels close to space needle in Seattle excluding motels." The statement shows a more specialized query, wherein arguments such as "where" and "near", which were deduced from "close to" and "in", are used as search parameters that reduce the search area. In addition, words such as "excluding" or "but not" are used to filter point of interest (POIs) which are of no interest to the user. In one embodiment, the computation platform 109 may train the mapping module 203 to associate words in a string with the relevant classification. In one scenario, the computation platform 109 may parse and map user A's statement "Find me hotels close to space needle in Seattle excluding motels" as follows:

Function=SHOW_ON_MAP
Where=Seattle
Near=space needle
Target=hotels
Exception=motels Then, the cartography application in at least one UE 101 may reply to a search function by displaying a list of hotels close to space needle [703] in Seattle in the at least one mapping interface UE 101 [705]. The search excludes any motels within the geographic area. In another scenario, the computation platform 109 may associate ambiguous words with their cartography-related meanings rather than with their alternate meanings.

FIG. 7C is a user interface diagram that represents contextual caching and transition between plurality of query processing levels, according to one example embodiment. In one scenario, the first query processing level may relate to explicit instructions, and the knowledge required to satisfy the query resides within database 111. In another scenario, the second query processing level may relate to a level of processing where the knowledge required to satisfy the query resides outside the database 111. In a further scenario, the third query processing level may include routing between at least two locations based on at least one function and/or at least one parameter and/or contextual information. In one embodiment, the computation platform 109 may execute at least one command between the plurality of levels based on the availability of the one or more parameters (e.g., $F(x,y,z)$). In one example embodiment, user A may state "Where is the closest coffee shop", whereupon the computation platform 109 may parse and map user A's statement. The computation platform 109 may cause first query processing level and second query processing level to determine nearby coffee shops. Once the nearby coffee shops are determined, the computation platform 109 may cause the third query processing level to calculate routes to the closest coffee shops, whereupon the route to the closest coffee shop is displayed to the user. In another example embodiment, user A may state "Take me there", whereupon the computation platform 109 may parse and map the natural language input to cause contextual caching. Subsequently, the computation platform 109 may start the navigation at level 1. The resolved target object, here <location of the closest coffee shop>, is the answer taken from the contextual cache, as it was previously provided as a result for the target=<closest coffee shop>. Then, the cartography application in at least one UE 101 may reply to the natural language input by displaying a route from the user's current location [707] to the closest coffee shop [709] in the at least one mapping interface UE 101 [711].

FIG. 7D is a user interface diagram wherein at least one optimal route is determined based, at least in part, on the natural language input, according to one example embodiment. In one scenario, user A may utter "take me to ABC city and stop at a restaurant" to his/her UE 101. Subsequently, user A may also utter "also stop at a departmental store." Since the command involves multiple target destinations, the computation platform 109 may come up with a more optimal way to build a route rather than follow the exact order specified by user A. The computation platform 109 may determine at least one route based, at least in part, on contextual information associated with at least one device associated with user A, location information of the at least one restaurant, location information of the at least one department store, or a combination thereof. Then, the computation platform 109 may cause a presentation of at least one route that includes at least one restaurant [713], at least one department store [715] within ABC city. In another scenario, the computation platform 109 may incorporate distance information (e.g., the closest restaurant and department store), traffic density information (e.g., the fastest route to the closest restaurant and department store), temporal information (e.g., the timing of the restaurant and department store), or a combination thereof while determining at least one optimal route.

The processes described herein for classifying natural language input into plurality of query processing levels may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
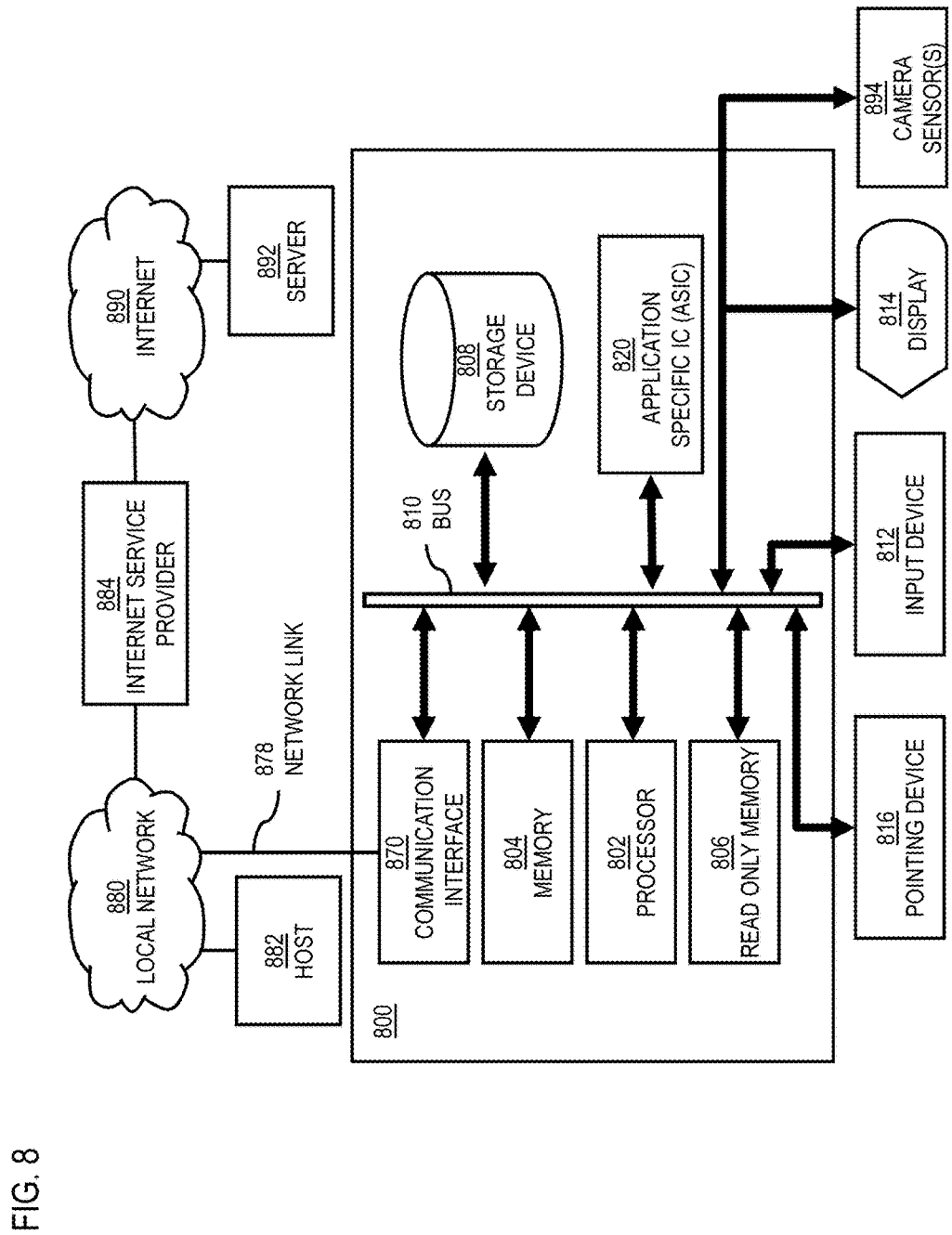
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to classify natural language input into plurality of query processing levels as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of classifying natural language input into plurality of query processing levels.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to classifying natural language input into plurality of query processing levels. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 800 also includes a memory 804 coupled to bus 810. The memory 804, such as a random access memory (RAM) or any other dynamic storage device, stores information including processor instructions for classifying natural language input into plurality of query processing levels. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for classifying natural language input into plurality of query processing levels, is provided to the bus 810 for use by the processor from an external input device 812, such as a keyboard containing alphanumeric keys operated by a user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814, and one or more camera sensors 894 for capturing, recording and causing to store one or more still and/or moving images (e.g., videos, movies, etc.) which also may comprise audio recordings. In some embodiments, for example, in embodiments in which the computer system 800 performs all functions automatically without human input, one or more of external input device 812, display device 814 and pointing device 816 may be omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 107 for classifying natural language input into plurality of query processing levels to the UE 101.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to classify natural language input into plurality of query processing levels as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of classifying natural language input into plurality of query processing levels.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to classify natural language input into plurality of query processing levels. The memory 905 also stores the data associated with or generated by the execution of the inventive steps.

Figure 10:
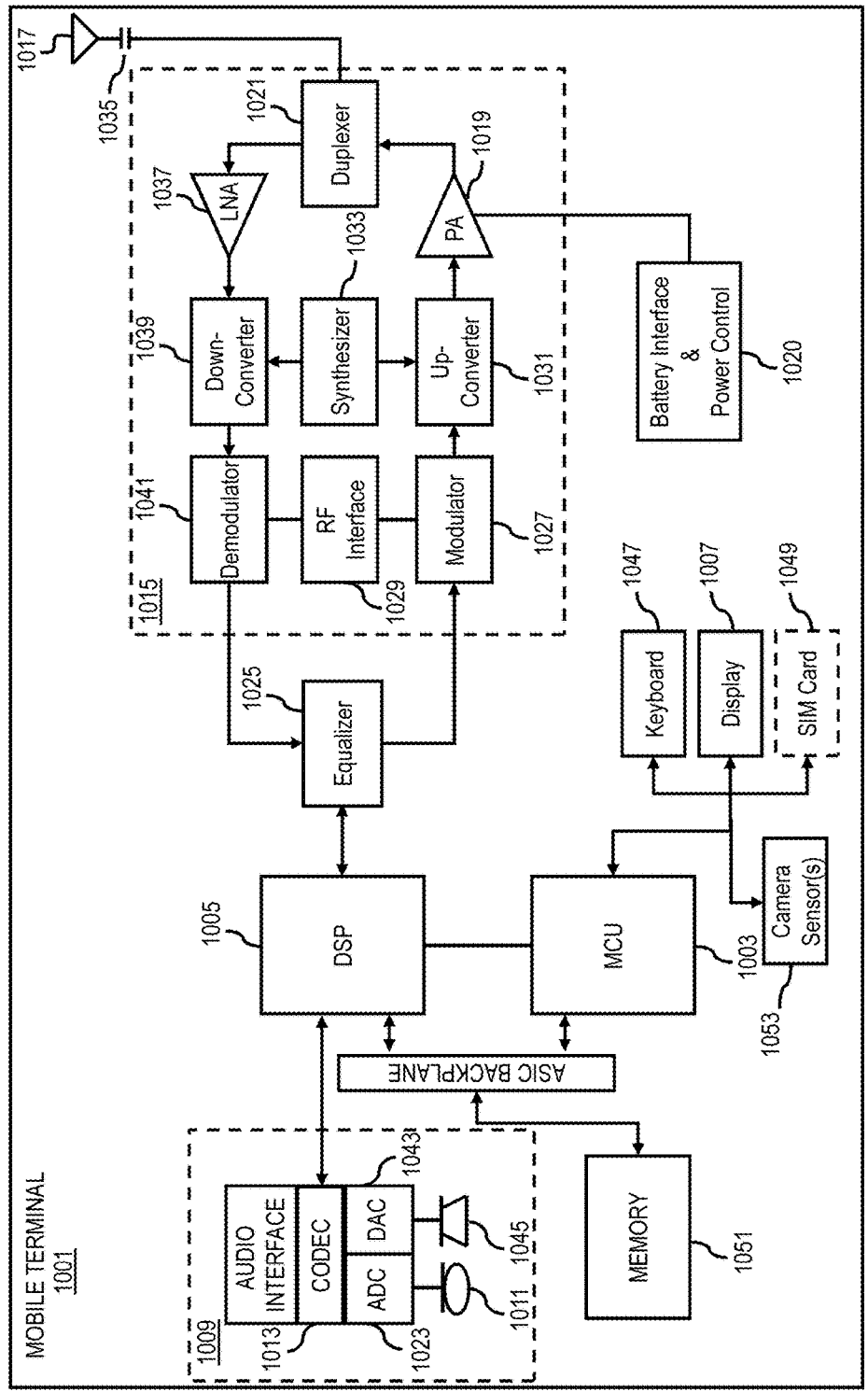
FIG. 10 is a diagram of a mobile terminal (e.g., handset) that can be used to implement an embodiment of the invention.

FIG. 10 is a diagram of exemplary components of a mobile terminal (e.g., handset) for communications, which is capable of operating in the system of FIG. 1A, according to one embodiment. In some embodiments, mobile terminal 1001, or a portion thereof, constitutes a means for performing one or more steps of classifying natural language input into plurality of query processing levels. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of classifying natural language input into plurality of query processing levels. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to classify natural language input into plurality of query processing levels. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet.

The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

Further, one or more camera sensors 1053 may be incorporated onto the mobile station 1001 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   parsing, by an apparatus, at least one natural language input into one or more words, wherein the at least one natural language input represents at least one cartographic query;
   mapping, by the apparatus, the one or more words to at least one function of a cartography system and storing as one or more word-function mappings;
   determining, by the apparatus, an availability of the at least one function, one or more parameters associated with the at least one function, and the one or more word-function mappings with respect to at least one component of the cartography system;
   classifying, by the apparatus, the at least one cartographic query into at least one of a plurality of query processing levels based, at least in part, on the availability, wherein the query processing levels include (1) a local processing level at which the at least one function, the one or more parameters, or a combination thereof are executed in whole locally at the at least one component of the cartography system based, at least in part, on matching the one or more word-function mappings with predetermined word-function mappings stored locally, (2) a searching processing level at which the at least one function, the one or more parameters, or a combination thereof are executed, at least in part, by conducting at least one search external to the at least component of the cartography system when the one or more word-function mappings are not matched locally, and (3) a routing processing level at which the at least one function, the one or more parameters, or a combination thereof are executed, at least in part, by routing among locations included in the at least one natural language input based, at least in part, on distance information, traffic density information, and temporal information associated with the locations;

initiating, by the apparatus, an execution of the at least one function at the classified at least one query processing level, wherein the execution of the at least one function generates one or more results of the at least one cartographic query based, at least in part, on the one or more parameters; and initiating, by the apparatus, a presentation of the one or more results as cartographic information in a user interface of the cartography system.

2. A method of claim 1, wherein the locations include a location and at least two points of interest, and the routing is processed without regard to an input order of the at least two points of interest.

3. A method of claim 2, wherein the routing processing level reorders the at least two points of interest in a new order and routes among the location and locations of the at least two points of interest based on the new order.

4. A method of claim 3, further comprising:
determining the locations of the at least two points of interest based, at least in part, on the at least one function, the one or more parameters, contextual information, or a combination thereof.

5. A method of claim 3, further comprising:
determining the new order of the at least two locations based distance information, traffic density information, temporal information, or a combination thereof of the location and the locations of the at least two points of interest.

6. A method of claim 1, further comprising:
determining the one or more parameters from the natural language input,
wherein the apparatus is embedded in a mobile user device.

7. A method of claim 1, further comprising:
determining the one or more parameters from at least one contextual cache,
wherein the at least one contextual cache stores one or more previous results, one or more previous functions, one or more previous parameters, or a combination thereof associated with at least one previous cartographic query.

8. A method of claim 1, wherein the determining of the availability, the classifying of the at least one cartographic query, the execution of the at least one function, or a combination thereof is performed on receiving the at least one natural language input by the at least one component of the cartography system.

9. A method of claim 1, further comprising:
formatting the one or more results according to at least one format associated with at least one module external to the at least one component; and
transmitting the formatted one or more results to the at least one module to initiate the presentation of the one or more results in the user interface.

10. A method of claim 1, further comprising:
building a search query for the at least one search external to the at least component of the cartography system in a format different from a format of the predetermined word-function mappings stored locally; and
sending the search query out of the at least component of the cartography system.

11. A method of claim 10, wherein the format of the predetermined word-function mappings are accessible locally, and the format of the search query is not accessible locally.

12. A method of claim 1, wherein the temporal information includes point-of interest timing information associated with the locations, and the routing among the locations is based, at least in part, on the point-of interest timing information.

13. An apparatus comprising:
at least one processor; and
at least one memory including computer program code for one or more programs,
the at least one memory and the computer program code configured to, with the at least one processor, cause the apparatus to perform at least the following,
parse at least one natural language input into one or more words, wherein the at least one natural language input represents at least one cartographic query;
map the one or more words to at least one function of a cartography system and storing as one or more word-function mappings;
determine an availability of the at least one function, one or more parameters associated with the at least one function, and the one or more word-function mappings with respect to at least one component of the cartography system;
classify the at least one cartographic query into at least one of a plurality of query processing levels based, at least in part, on the availability, wherein the query processing levels include (1) a local processing level at which the at least one function, the one or more parameters, or a combination thereof are executed in whole locally at the at least one component of the cartography system based, at least in part, on matching the one or more word-function mappings with predetermined word-function mappings stored locally, (2) a searching processing level at which the at least one function, the one or more parameters, or a combination thereof are executed, at least in part, by conducting at least one search external to the at least component of the cartography system when the one or more word-function mappings are not matched locally, and (3) a routing processing level at which the at least one function, the one or more parameters, or a combination thereof are executed, at least in part, by routing among locations included in the at least one natural language input based, at least in part, on distance information, traffic density information, and temporal information associated with the locations;
initiate an execution of the at least one function at the classified at least one query processing level, wherein the execution of the at least one function generates one or more results of the at least one cartographic query based, at least in part, on the one or more parameters; and
initiate a presentation of the one or more results as cartographic information in a user interface of the cartography system.

14. An apparatus of claim 13, wherein the locations include a location and at least two points of interest, and the routing is processed without regard to an input order of the at least two points of interest.

15. An apparatus of claim 14, wherein the routing processing level reorders the at least two points of interest in a new order and routes among the location and locations of the at least two points of interest based on the new order.

16. An apparatus of claim 15, wherein the apparatus is further caused to:
determine the locations of the at least two points of interest based, at least in part, on the at least one function, the one or more parameters, contextual information, or a combination thereof.

17. An apparatus of claim 15, wherein the apparatus is further caused to:
determine the new order of the at least two locations based distance information, traffic density information, temporal information, or a combination thereof of the location and the locations of the at least two points of interest.

18. An apparatus of claim 13, wherein the apparatus is further caused to:
determine the one or more parameters from the natural language input.

19. A non-transitory computer-readable storage medium carrying one or more sequences of one or more instructions which, when executed by one or more processors, cause an apparatus to at least perform the following steps:
parsing at least one natural language input into one or more words, wherein the at least one natural language input represents at least one cartographic query;
mapping the one or more words to at least one function of a cartography system and storing as one or more word-function mappings;
determining an availability of the at least one function, one or more parameters associated with the at least one function, and the one or more word-function mappings with respect to at least one component of the cartography system;
classifying the at least one cartographic query into at least one of a plurality of query processing levels based, at least in part, on the availability, wherein the query processing levels include (1) a local processing level at which the at least one function, the one or more parameters, or a combination thereof are executed in whole locally at the at least one component of the cartography system based, at least in part, on matching the one or more word-function mappings with predetermined word-function mappings stored locally, (2) a searching processing level at which the at least one function, the one or more parameters, or a combination thereof are executed, at least in part, by conducting at least one search external to the at least component of the cartography system when the one or more word-function mappings are not matched locally, and (3) a routing processing level at which the at least one function, the one or more parameters, or a combination thereof are executed, at least in part, by routing among locations included in the at least one natural language input based, at least in part, on distance information, traffic density information, and temporal information associated with the locations;
initiating an execution of the at least one function at the classified at least one query processing level, wherein the execution of the at least one function generates one or more results of the at least one cartographic query based, at least in part, on the one or more parameters; and
initiating a presentation of the one or more results as cartographic information in a user interface of the cartography system.

20. A non-transitory computer-readable storage medium of claim 19, wherein the locations include a location and at least two points of interest, and the routing is processed without regard to an input order of the at least two points of interest.

* * * * *